Patented June 7, 1938

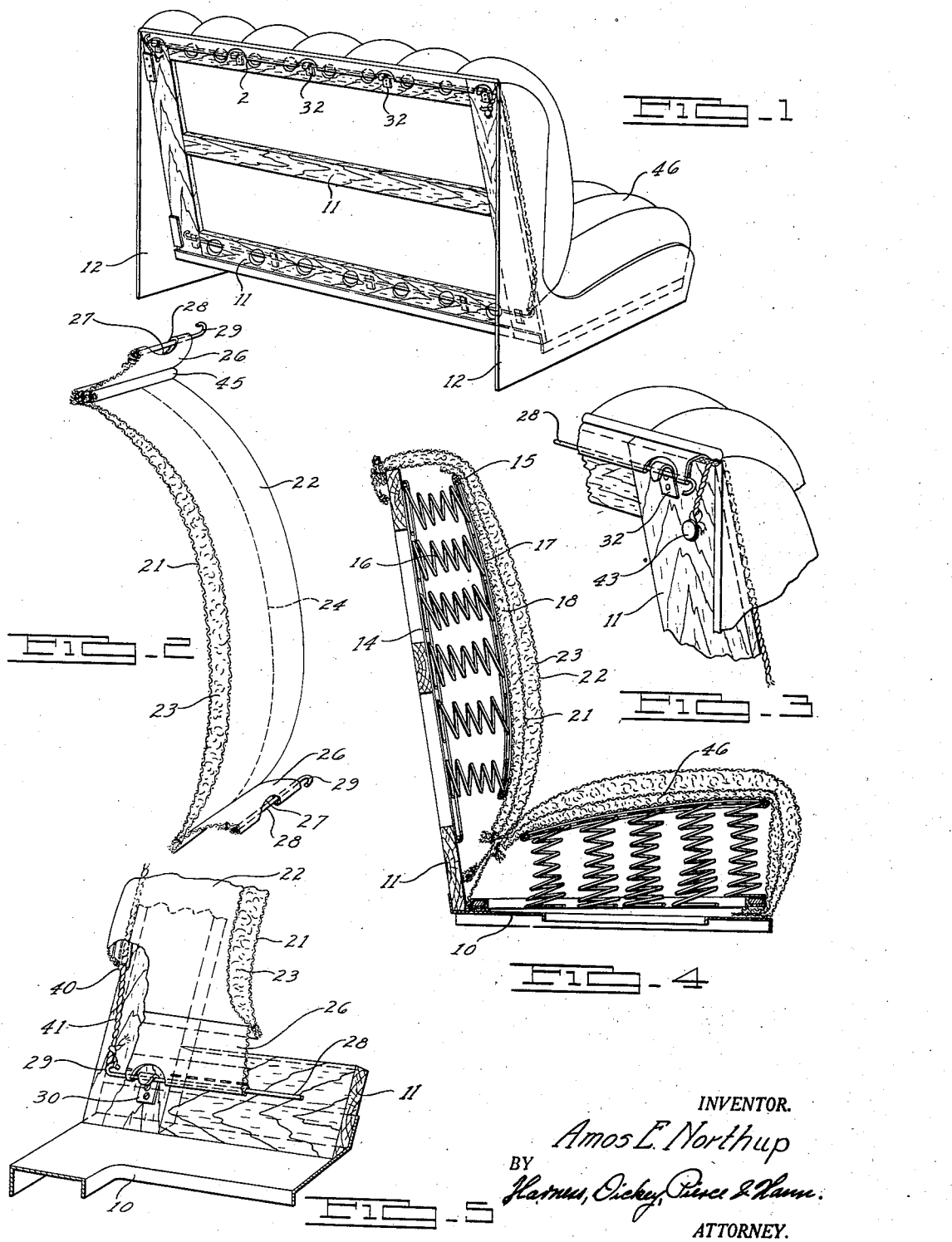

2,120,036

UNITED STATES PATENT OFFICE 2,120,036

DISPLACEABLE UPHOLSTERY TRIM

Amos E. Northup, Pleasant Ridge, Mich., assignor to The Murray Corporation of America, a corporation of Delaware Application December 12, 1935, Serial No. 54,093

3 Claims. (Cl. 155—180)

This invention relates generally to seat construction. More particularly it relates to a novel and extremely satisfactory means for displaceably mounting upholstery trim on automobile seats.

While it will be apparent that the inventive concept presented in this application will find great utility in many other fields, the specific embodiment of the invention herein shown and described relates primarily to demountably securing an upholstery trim panel on the back cushion member of a conventional automobile seat.

Heretofore, in a completely assembled automobile construction, the upholstery trim material has been permanently secured to the seat back cushion by means of tacking, molding strips and various other means conventional in the art. Consequently, should it be found desirable to change the trim material used, it is almost necessary to completely disassemble the seat construction in order to install new trim material thereon.

It is a general object of the present invention to provide a construction which will permit the relatively convenient installation of upholstery trim in a very simple manner in order that in a conventional automobile body construction upholstery trim may be conveniently selected by a prospective purchaser and immediately installed by relatively unskilled labor.

It is a primary object of the present invention to provide a displaceable upholstery trim panel primarily adapted for use in connection with seat backs, which is demountably secured to the seat back by securing means at the marginal edge of the trim panel and which is, due to its novel mounting, tensioned over the seat back construction.

While it will be apparent that the inventive concept disclosed in this case is equally well adaptable to seat cushions, its primary use in the art is in connection with seat backs because, as a rule, cushion constructions are displaceably mounted with respect to the body and in case a particular material is desired for the interior upholstery of a vehicle body, it is a relatively simple matter to substitute an entirely new cushion.

Yet another object of the present invention consists in the provision of securing means mounted permanently on the frame on which the seat back is mounted and means cooperating with said securing means for displaceably mounting the upholstery trim thereon, the spring construction of the seat back serving to maintain the upholstery trim permanently mounted in place.

Many other and further objects and advantages of the invention disclosed herein will become apparent from the following specification when considered in connection with the accompanying drawing forming a part thereof.

In the drawing:—

Figure 1 is a rear perspective view of a seat construction embodying the displaceable mounting of the present invention;

Fig. 2 is a fragmentary perspective view of a section of the improved displaceable upholstery trim;

Fig. 3 is an enlarged, fragmentary perspective view illustrating the manner in which the top marginal edge and one of the lateral edges are displaceably secured to the seat back frame;

Fig. 4 is a vertical, sectional view illustrating the improved construction showing in detail the manner in which the displaceable upholstery trim is mounted on the seat back;

Fig. 5 is a fragmentary, perspective view of the lower corner of the seat frame with the cushion removed, showing the manner in which the displaceable trim material is secured thereto.

With more particular reference to the drawing, the specific embodiment of the invention illustrated therein comprises a base frame 10 which may be formed of wood or composite construction, as may be desired, and is illustrated in the drawing as a single, integral, sheet metal stamping of generally rectangular configuration and having the members thereof generally of downwardly presenting channel section. Secured to the rear marginal edge of the base frame 10 is a seat back frame 11 which likewise may be formed of any suitable construction and is shown in the drawing as being formed of a plurality of wooden members together constituting a generally rectangular framework substantially the size of the seat back cushion. The frame members 10 and 11 are maintained in predetermined angular position with respect to each other by means of a pair of end members 12 such as are conventional in the art.

A seat back cushion is permanently mounted on the seat back frame 11 and while it will be apparent that any suitable type of spring cushion may be used, by way of illustration the drawing discloses a conventional coil spring cushion comprising a pair of substantially coextensive frame members 14 and 15 serving to mount a plurality of coil springs 16. As is conventional in the art, the frame 15 may be covered by a suitable fabric backing member of burlap or similar material 17 and has provided thereon a suitable layer of padding 18.

The improved displaceable upholstery trim panel comprises a pair of sections of suitable fabric material secured together in their marginal edges and having a filling of padding therebetween. As is best seen in Fig. 2, a backing section 21 is secured in its marginal edges to an outer or reveal section of fabric material 22 and the space therebetween is filled with a suitable layer of resilient upholstery material 23 such for example as loosely matted cotton linters. These two sections of material are preferably secured together through the padding 23 along vertically extending lines of stitching 24 to provide a tufted effect to the upholstery trim or any other suitable interconnection of these two sections may be provided depending upon the exact nature of the finished surface desired. Auxiliary sections of suitable fabric material 26 are also preferably secured to the marginal edges of the sections 21 and 22 and means are provided in these auxiliary sections for displaceably securing the upholstery trim as a whole over the seat back cushion. These auxiliary strips 26 are preferably hemmed to provide tubular portions in their marginal edges. Notches are cut in these hem portions to provide access to the tubular hem at various desired intervals therealong. Means are inserted within the tubular hem for providing a relatively stiff marginal edge thereon and while any suitable means may be used, it has been found preferable to use an insert member formed of a metal rod or wire 28. After insertion into the tubular portion of the auxiliary fabric member 26, the rod 28 may be bent at its ends to provide loop portions 29, the purpose and function of which will hereinafter become clear.

On the forward side of the frame at suitable intervals along the lower transverse member thereof, are located a plurality of hooks 30 which may be formed of sheet metal or suitable similar material and are preferably permanently secured to the frame along a transverse line below the lower marginal edge of the seat back cushion. A similar series of hooks 32 are secured to the rear side of the upper transverse frame member. By reference to Figs. 1, 3, 4 and 5 of the drawing, it will be clearly seen that these hook shaped brackets 30 and 32 serve to extend within the notches 27 provided in the auxiliary fabric strips 26 and engage the stiffening rods 28 which are mounted therein. The upholstery trim panel as a whole is preferably proportioned so that after the lower rod member 28 is secured by the hook shaped brackets 30, it will be necessary to compress the seat back cushion to some extent in order to hook the upper rod 28 beneath the cooperating hook shaped brackets 32. This insures that the upholstery trim panel as a whole will be tensioned over the seat back cushion in order that a smooth and attractive finish will be provided therefor.

The lateral marginal edges of the outer or reveal covering 22 of the upholstery trim are preferably hemmed to provide a tubular portion 40 shown in Fig. 5. Suitable flexible draw cords 41 are preferably secured at their lower ends to the loops 29 in the outer ends of the stiffening rods 28 and pass upwardly through this tubular hem 40. After the stiffening rods 28 have been secured against the hooks 30 and 32, the draw string 41 is tensioned, thus drawing the lateral marginal edge of the outer reveal covering 22 closely around the end of the seat back cushion. One of these draw strings is provided at each of the lateral sides of the upholstery trim panel and it is apparent that tensioning of these draw strings serves to tension the upholstery trim transversely of the seat in order to insure a smooth and attractive finish. After the draw string has been tensioned, it may be secured by means of a suitable tack 43 to the rear side of the seat back frame 11.

It will be apparent that the seam interconnecting the auxiliary strip 26 with the lower marginal edge of the body portion of the trim panel will be concealed by the seat cushion of the seat construction and hence no finish for this seam is necessary at this point. However, at the points of securement of the upper marginal edge of the displaceable upholstery panel, the seam between the body portion of the panel and the auxiliary section 26 may be hidden by means of a suitable bead or garnish molding member 45.

From the foregoing it will be apparent that displaceable upholstery trim may be mounted upon a seat cushion in substantially the same manner as has been illustrated in connection with the seat back cushion shown in the drawing and described above. In the present construction, however, is shown a seat cushion 46 of substantially conventional construction displaceably mounted on the base frame 10 cooperating with the seat back construction to provide a complete seat.

The specific embodiment of the invention illustrated in the drawing and described above is merely illustrative of one of many forms which the generic inventive concept herein disclosed may take. Many other and further modifications falling within the scope of the subjoined claims will be apparent to those skilled in the art.

I claim as my invention:

1. In a seat construction, a seat back frame, a resilient seat back cushion mounted on said frame, an upholstery panel having top, bottom and side edges adapted for demountable securement over said seat back cushion, said upholstery panel including superimposed connected fabric members having hems in their top and bottom edges as well as in their lateral side edges, stiffening rods extending through the hems at the top and bottom of said panel, hooks on said frame adjacent the top and bottom thereof engaging said rods to anchor said panel in position upon said cushion, and flexible means extending through the hems of said panel at the lateral side edges of said panel tensioning said panel transversely across said cushion.

2. In a seat construction, a seat back frame, a resilient seat back cushion mounted on said frame, a section of fabric finish material for covering said seat back cushion having top, bottom and sides, said fabric finish material having hemmed portions providing tunnels at each of the marginal edges thereof, stiffening rods extending through the tunnels at the top and bottom edges of said panel, a plurality of hooks mounted on said frame adjacent the top and bottom thereof, the tunnels at the top and bottom of said finish material having cut-out portions whereby said hooks engage and anchor said stiffening rods, and flexible means extending through the hems at the sides of said finish material for tensioning the same transversely across said cushion.

3. In a seat construction, a seat back frame, a resilient seat back cushion mounted on said frame, an upholstery panel having top, bottom and side edges adapted for demountable securement over said seat back cushion, said upholstery panel including superimposed connected fabric members having hems in their top and bottom edges as well as in their lateral side edges, stiffening rods extending through the hems at the top and bottom of said panel, hooks on said frame adjacent the top and bottom thereof engaging said stiffening rods to demountably secure said panel in position on said cushion, a pair of drawstrings, one at each end of said frame extending through the hem in the side of said panel and means for anchoring one end of said drawstrings to said frame, and means for anchoring the opposite end of said drawstrings to one of said stiffening rods to tension said panel transversely over said cushion.

AMOS E. NORTHUP.